United States Patent
Poletti

(10) Patent No.: US 12,170,615 B2
(45) Date of Patent: Dec. 17, 2024

(54) NETWORK EQUIPMENT WITH INTER-NETWORK POLICY-BASED ROUTING FUNCTION

(71) Applicant: Airbus Defence and Space SAS, Toulouse (FR)

(72) Inventor: Claude Poletti, Toulouse (FR)

(73) Assignee: Airbus Defence and Space SAS, Toulouse (FR)

( * ) Notice: Subject to any disclaimer, the term of this patent is extended or adjusted under 35 U.S.C. 154(b) by 37 days.

(21) Appl. No.: 17/416,333

(22) PCT Filed: Dec. 19, 2019

(86) PCT No.: PCT/EP2019/086184
§ 371 (c)(1),
(2) Date: Jun. 18, 2021

(87) PCT Pub. No.: WO2020/127648
PCT Pub. Date: Jun. 25, 2020

(65) Prior Publication Data
US 2022/0070094 A1    Mar. 3, 2022

(30) Foreign Application Priority Data

Dec. 20, 2018   (FR) ...................... 1873485

(51) Int. Cl.
*H04L 12/741*      (2013.01)
*H04L 45/74*       (2022.01)
*H04L 69/08*       (2022.01)

(52) U.S. Cl.
CPC .............. *H04L 45/74* (2013.01); *H04L 69/08* (2013.01)

(58) Field of Classification Search
CPC .......... H04L 45/04; H04L 45/74; H04L 69/08
See application file for complete search history.

(56) References Cited

U.S. PATENT DOCUMENTS

| | | | |
|---|---|---|---|
| 2010/0014537 A1 | 1/2010 | Jacquet et al. | |
| 2012/0189005 A1 | 7/2012 | Crambert et al. | |
| (Continued) | | | |

FOREIGN PATENT DOCUMENTS

| | | |
|---|---|---|
| EP | 1583287 A1 | 10/2005 |
| WO | 2011012569 A1 | 2/2011 |

OTHER PUBLICATIONS

International Search Report; priority document.
(Continued)

*Primary Examiner* — Mansour Oveissi
*Assistant Examiner* — David M Oveissi
(74) *Attorney, Agent, or Firm* — Greer, Burns & Crain, Ltd.

(57) ABSTRACT

In order to route a data packet in a communication network, a network element implements a traditional routing process including taking a routing decision as a function of the destination of the data packet according to route learning in the communication network. The routing element reviews the routing decision taken by the traditional routing process via an internetwork policy-based routing function selected from among a plurality of candidate internetwork policy-based routing functions, each candidate internetwork policy-based routing function being assigned to an egress interface of the network element and vice versa. The selected inter-network policy-based routing function is that which is assigned to the egress interface selected by the traditional routing process for routing the data packet in the communication network.

11 Claims, 9 Drawing Sheets

(56) References Cited

U.S. PATENT DOCUMENTS

| | | | |
|---|---|---|---|
| 2014/0204909 A1* | 7/2014 | Cheng | H04W 8/082 370/331 |
| 2016/0294677 A1* | 10/2016 | Kazerani | H04L 45/247 |
| 2020/0128038 A1* | 4/2020 | Neystadt | H04L 45/74 |

OTHER PUBLICATIONS

S. Hassan et al., "Border Gateway Protocol based Path Vector Mechanism for Inter-domain Routing in Software Defined Network Environment" 2016 IEEE Conference on Open Systems (ICOS), Oct. 10-12, 2016, Langkawi, Malaysia, pp. 76-80.

\* cited by examiner

NETWORK EQUIPMENT WITH INTER-NETWORK POLICY-BASED ROUTING FUNCTION

CROSS-REFERENCES TO RELATED APPLICATIONS

This application claims the benefit of the International Application No. PCT/EP2019/086184, filed on Dec. 19, 2019, and of the French patent application No. 1873485 filed on Dec. 20, 2018, the entire disclosures of which are incorporated herein by way of reference.

FIELD OF THE INVENTION

The present invention relates to routing through network elements, such as routers, in a communication network interconnecting such network elements by internetwork communication links.

BACKGROUND OF THE INVENTION

In packet switching communication networks, network elements NE, also called "network nodes", such as routers, automatically decide the paths to be followed by the packets. FIG. 1A schematically shows an arrangement of such a network element NE 100 according to the prior art. The network element NE 100 comprises a set of interfaces 110, 111*a*, 111*b*, 111*c*, whether physical or virtual. When a data packet is received via one ingress interface from among these interfaces, for example, the interface 110, the network element NE 100 must decide toward which egress interface, for example, one interface from among the interfaces 111*a*, 111*b*, 111*c*, the received data packet is to be routed. The interface 110 in this case is an ingress interface and the other interfaces 111*a*, 111*b*, 111*c* are egress interfaces. The interface 110 is typically connected to one of the other interfaces 111*a*, 111*b*, 111*c* in order to form an ingress-egress interface.

The network element NE implements a routing decision mechanism, also called Traditional Routing Process TRP 101. This traditional routing process TRP 101 decides, more specifically as a function of the destination address of the received data packet according to route learning in the communication network, toward which egress interface the data packet is to be routed so that the data packet can reach the intended recipient.

To this end, the traditional routing process TRP 101 applies dynamic rules, i.e., dynamically learned, defined by the control plane, in a distributed manner between network elements NE of the communication network and/or in a centralized manner. These dynamic rules are rewritten in routing tables and in forwarding tables. It should be noted that the dynamism of the dynamic rules mentioned herein is relatively low. Indeed, these dynamic rules are learned following a change of link-state of the communication network and do not change until a new change of link-state of the communication network occurs. In addition to the dynamic rules, static rules can be added through a configuration in the routing tables and in the forwarding tables. The routing tables are used to define the awareness of routing possibilities, i.e., the awareness of the routes, which is acquired by the traditional routing process TRP 101 by virtue of the control plane. The forwarding tables are used to retain the most suitable routes from among those stored in the routing tables.

The traditional routing process TRP 101 thus comprises an Automatic Routing Process ARP made up of these dynamic rules and optionally of these static rules, with the routing decisions being taken by applying the static rules before the dynamic rules. The automatic routing process ARP takes routing decisions according to "hard-coded" criteria that are supported by the route learning protocol of the communication network. The routing rules can evolve as the link-states of the communication network evolve, but the routing decision criteria remain the same.

In the traditional routing process TRP 101, the automatic routing process ARP can be supplemented by routing policies on the ingress interfaces of the considered network element NE. This is referred to as "Policy-Based Routing" PBR. Thus, when a data packet is received via one of its ingress interfaces, the network element NE 100 firstly checks whether the received packet matches ("matching") a PBR routing rule. If so, the network element NE 100 follows the routing instructions defined in the PBR routing rule in order to decide toward which egress interface the data packet will be routed. Otherwise, the network element NE 100 seeks to apply the automatic routing process ARP and checks whether the received packet corresponds to a routing rule defined in its forwarding table. If so, the network element NE 100 follows the routing instructions defined in the forwarding table in order to decide toward which egress interface the data packet will be routed. This aspect is schematically illustrated in FIG. 1B. In further detail, in a step S151, the network element NE 100 receives a data packet via an ingress interface of the network element NE 100. In a step S152, the network element NE 100 verifies whether the received packet corresponds to a PBR routing rule. If so, a step S156 is carried out, in which the network element NE 100 takes a routing decision in accordance with the PBR routing rule to which the received data packet corresponds, and a step S157 is subsequently carried out; otherwise, a step S153 is carried out. In step S153, the network element NE 100 turns to the automatic routing process ARP and verifies whether the received packet corresponds to a routing rule in the forwarding table. If so, step S156 is carried out, in which the network element NE 100 takes a routing decision in accordance with the routing rule found in the forwarding table and to which the received data packet corresponds, and step S157 is subsequently carried out; otherwise, a step S154 is carried out. In step S154, the network element NE 100 verifies whether the received packet corresponds to a default route. If so, step S156 is carried out, in which the network element NE 100 takes a routing decision in accordance with the default route, and step S157 is subsequently carried out; otherwise, a step S155 is carried out. In step S155, the network element NE 100 is considered to be unable to take a routing decision relating to the received data packet and then drops the data packet; by contrast, in step S157, the network element NE 100 was able to take a routing decision relating to the received data packet and applies the routing decision taken in step S156, and then transmits the data packet via its corresponding egress interface.

It follows from the above that the PBR routing rules are applied at the input of the network elements NE, as an alternative to the automatic routing process ARP. In other words, either the PBR routing rules are applied, or the routing rules of the automatic routing process are applied, with the enforcement of the PBR routing rules preempting the enforcement of the routing rules of the automatic routing process ARP. This approach of the prior art nevertheless raises some problems. Indeed, the alternative approach of the PBR routing rules compared to the automatic routing process ARP entails side effects involving the unwanted diversion of some data packets, and therefore the unintentional interruption of communication links, due to the fact that the actual routing decision is taken at the input of the network element NE 100. This situation is illustrated in FIGS. 1C and 1D.

FIG. 1C shows two streams of data packets A and B passing through a communication network made up of at least three network elements NE 100*a*, 100*b*, 100*c*, 100*d* interconnected by internetwork communication links 210. The interconnection of the network elements NE 100*a*, 100*b*, 100*c*, 100*d* by the internetwork communication links 210 creates redundancies of paths for communicating between pairs of network elements NE. The data streams of data packets A and B relate to similar applications and therefore are of the same type. The stream of data packets A is routed between network element NE 100*a* and network element NE 100*c*, and the stream of data packets B is routed between network element NE 100*a* and network element NE 100*b*. The routing shown in FIG. 1C results from routing decisions taken by the automatic routing process ARP, typically in this case based on a routing protocol seeking the shortest path.

By introducing a PBR routing rule into the network element NE 100*a* that aims to interrupt the internetwork communication link 210 between network element NE 100*a* and network element NE 100*c* with respect to the stream of data packets A, the routing shown in FIG. 1D is obtained. Given that the PBR routing rule typically is unaware of the possible routes in the communication network, the routing rule also interrupts the internetwork communication link 210 between network element NE 100*a* and network element NE 100*b* by also diverting the stream of data packets B, since these data packets are of the same type. This results in overloading of the internetwork communication link 210 between network element NE 100*a* and network element NE 100*d*, as well as that between network element NE 100*d* and network element NE 100*b*. This situation can be particularly damaging if one and/or the other of these internetwork communication links 210 is congested, particularly in the case of a wireless link, which involves significant variations in transmission capacity, and therefore affects the Quality of Experience QoE. Thus, in order for the PBR routing rules to be effective and relevant, it becomes necessary to duplicate, within the PBR routing rules, the routing decision criteria of the automatic routing process ARP, and for the control plane of the PBR routing rules to consequently integrate route learning mechanisms. Attempting to counter the unwanted diversions of data packets or to gain flexibility in diverting some streams of data packets compared to other streams of data packets, particularly by questioning the routing decision criteria, makes the management of the PBR routing rules much more complex, which rules then must be dynamically adapted to the topological evolutions of the communication network, which are normally managed by the automatic routing process ARP. In addition, there is the fact that the PBR routing rules and the automatic routing process ARP are based on distinct control planes, and that it is typically necessary to cause these control planes to interact to allow route learning to be included in the PBR routing rules, or for fields to be added to the data packets so as to allow the PBR routing rules to become aware of the routes of the communication network.

It is desirable for these various disadvantages of the prior art to be overcome. Thus, it is desirable for a solution to be provided that allows greater configuration flexibility of the network elements for taking routing decisions.

SUMMARY OF THE INVENTION

An aim of the present invention is to propose a method for routing a data packet through a first network element of a communication network, further comprising a plurality of second network elements, the first and second network elements being interconnected by internetwork communication links, the routing method comprising a traditional routing process including taking a routing decision as a function of the destination of the data packet according to route learning in the communication network. The routing method further comprises a review of the routing decision taken by the traditional routing process by means of an internetwork policy-based routing function InPBR selected from among a plurality of candidate internetwork policy-based routing functions InPBR of the first network element, each candidate internetwork policy-based routing function InPBR being assigned to an egress interface of the first network element and vice versa, the selected internetwork policy-based routing function InPBR being the candidate internetwork policy-based routing function InPBR assigned to the egress interface selected by the traditional routing process for routing the data packet in the communication network.

Thus, given that an internetwork policy-based routing function InPBR exists for each egress interface and that the selected internetwork policy-based routing function InPBR is that which corresponds to the egress interface that corresponds to the routing decision of the traditional routing process, the internetwork policy-based routing function InPBR is inherently aware of the routing decision originating from the traditional routing process. Learning the routes in the routing rules is then no longer necessary, unlike the situation whereby the policy-based routing PBR of the prior art is implemented instead of the internetwork policy-based routing functions InPBR of the present invention. Unlike the PBR routing rules of the prior art, the control plane of the internetwork policy-based routing functions InPBR of the present invention does not need to interact with the control plane of the automatic routing process ARP of the traditional routing process in order to avoid the unwanted diversions of the data packets. Furthermore, as it is not worthwhile for the internetwork policy-based routing functions InPBR to learn the routes of the communication network, it is unnecessary to add fields to the data packets to this end.

According to a particular embodiment, with the first network element comprising a service control point assigned to each egress interface of the first network element and vice versa, the data packet is processed by the service control point assigned to the egress interface selected by the selected internetwork policy-based routing function InPBR, and each service control point includes an admission enforcement mechanism and a policy enforcement point.

Thus, the Quality of Service QoS management is improved, and the level of traffic congestion on each internetwork communication link is easily taken into account and controlled.

According to a particular embodiment, with the first network element comprising an egress processing function assigned to each egress interface of the first network element, the data packet is processed by the egress processing function assigned to the egress interface selected by the selected internetwork policy-based routing function InPBR.

Thus, processing can be easily applied to the data packets to be routed and/or statistics can be easily obtained from the data packets to be routed, according to the routing decision reviewed by the actually selected internetwork policy-based routing function InPBR.

According to a particular embodiment, with the first network element comprising, for each egress interface, as many egress processing functions as there are internetwork policy-based routing functions InPBR, the data packet is processed by an egress processing function selected from among the egress processing functions assigned to the egress interface selected by the selected internetwork policy-based routing function InPBR, with the selected egress processing function being the egress processing function associated with the selected internetwork policy-based routing function InPBR.

Thus, processing can be easily applied to the data packets to be routed and/or statistics can be easily obtained from the data packets to be routed, as a function of the actually selected internetwork policy-based routing function InPBR and as a function of the routing decision reviewed by this actually selected internetwork policy-based routing function InPBR.

According to a particular embodiment, with the first network element comprising a feedback loop from the egress processing functions to the internetwork policy-based routing functions InPBR, the egress processing functions supply the internetwork policy-based routing functions InPBR with information relating to the processing applied by the egress processing functions to the data packet.

Thus, the internetwork policy-based routing functions InPBR have information available, easily enhanced, relating to the internetwork communication links actually selected for routing the data packets.

According to a particular embodiment, the egress processing function assigned to the egress interface selected by the selected internetwork policy-based routing function InPBR requests that the selected internetwork policy-based routing function InPBR reviews its decision for routing the data packet on the basis of information simultaneously supplied by the egress processing function via the feedback loop.

Thus, a routing decision can be easily reviewed as a function of information linked, for example, to the internetwork communication link initially selected by the relevant internetwork policy-based routing function InPBR.

According to a particular embodiment, with the first network element comprising an egress processing function of the traditional routing process assigned to each egress interface of the first network element and vice versa, the data packet is processed by the egress processing function of the traditional routing process assigned to the egress interface selected by the traditional routing process before the review of the routing decision by the selected internetwork policy-based routing function InPBR.

Thus, processing can be easily applied to the data packets to be routed and/or statistics can be easily obtained from data packets to be routed, according to the routing decision initially taken by the traditional routing process.

According to a particular embodiment, with the first network element comprising a control loop from the egress processing functions of the traditional routing process to the internetwork policy-based routing functions InPBR, the egress processing functions of the traditional routing process supply the internetwork policy-based routing functions InPBR with information relating to the processing applied by the egress processing functions of the traditional routing process.

Thus, the internetwork policy-based routing functions InPBR have information available, easily enhanced, relating to the internetwork communication links initially selected by the traditional routing process for routing the data packets.

According to a particular embodiment, the traditional routing process implements the OSPF (Open Shortest Path First) link-state protocol.

Thus, the internetwork policy-based routing functions InPBR are based on a prior routing decision taken by an efficient traditional routing process.

According to a particular embodiment, the internetwork policy-based routing functions InPBR apply routing rules expressed in the form of regular expressions.

Thus, it is easy to update the internetwork policy-based routing functions InPBR.

The invention also relates to a computer program, which can be stored on a medium and/or downloaded from a communication network, in order to be read by a processor. This computer program comprises instructions for implementing the aforementioned method in any one of its embodiments, when the program is executed by the processor. The invention also relates to storage means, which store such a computer program.

The invention also relates to a network element, called first network element, of a communication network, further comprising a plurality of second network elements, the first and second network elements being intended to be interconnected by internetwork communication links, the first network element implementing a traditional routing process including taking a routing decision as a function of the destination of the data packet according to route learning in the communication network. The first network element further comprises means for reviewing the routing decision taken by the traditional routing process by means of an internetwork policy-based routing function InPBR selected from among a plurality of candidate internetwork policy-based routing functions InPBR of the first network element, each candidate internetwork policy-based routing function InPBR being assigned to an egress interface of the first network element and vice versa, the selected internetwork policy-based routing function InPBR being the candidate internetwork policy-based routing function InPBR assigned to the egress interface selected by the traditional routing process for routing the data packet in the communication network.

The invention also relates to a communication network comprising network elements interconnected by internetwork communication links, each network element being a network element as defined above.

BRIEF DESCRIPTION OF THE DRAWINGS

The aforementioned features of the invention, as well as other features, will become more clearly apparent from reading the following description of at least one embodiment, the description being provided with reference to the accompanying drawings, in which.

DETAILED DESCRIPTION OF THE PREFERRED EMBODIMENTS

Figure 2:
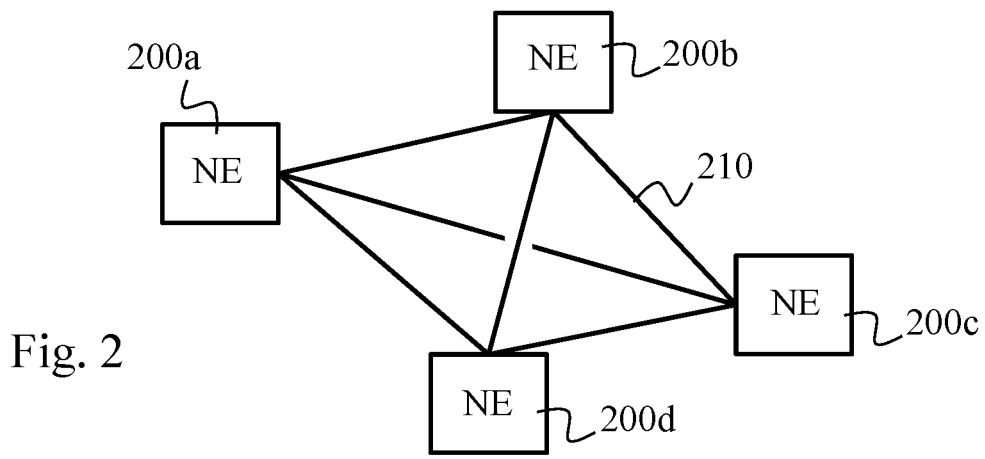
FIG. 2 schematically illustrates a communication network in which the present invention can be implemented.

FIG. 2 schematically illustrates a communication network in which the present invention can be implemented. The communication network comprises network elements NE 200, which can be denoted Cognition Defined Network Elements CDNE. Four network elements 200a, 200b, 200c and 200d are illustrated in FIG. 2. The network elements NE 200a, 200b, 200c, 200d are interconnected together by internetwork communication links 210. Each internetwork communication link 210 can be of the wired or wireless type.

The network elements NE 200a, 200b, 200c, 200d thus comprise as many ingress interfaces and as many egress interfaces as there are internetwork communication links 210, which are respectively connected thereto. Data packets pass through the communication network, and preferably IP (Internet Protocol) packets.

Figure 3A:
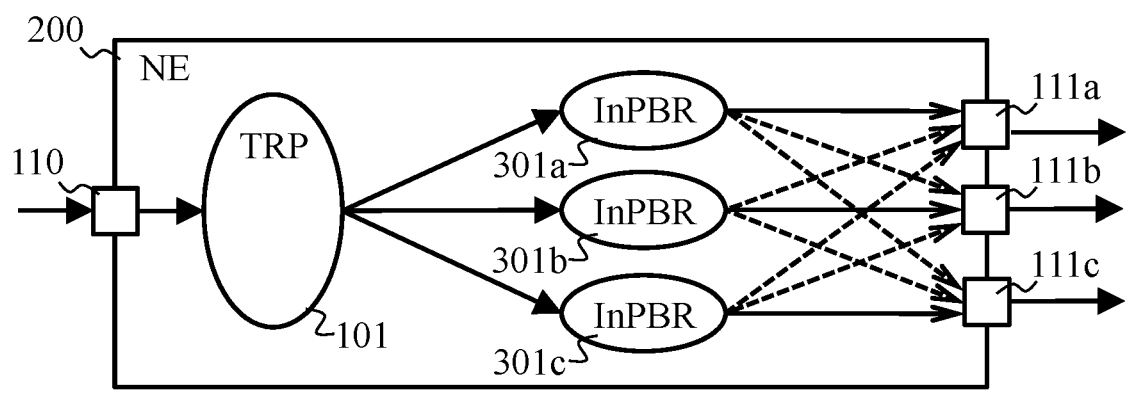
FIG. 3A schematically illustrates an arrangement of a network element according to one embodiment of the present invention.

FIG. 3A schematically illustrates an arrangement of one of the network elements NE 200, according to a first embodiment of the present invention.

Figure 1A:
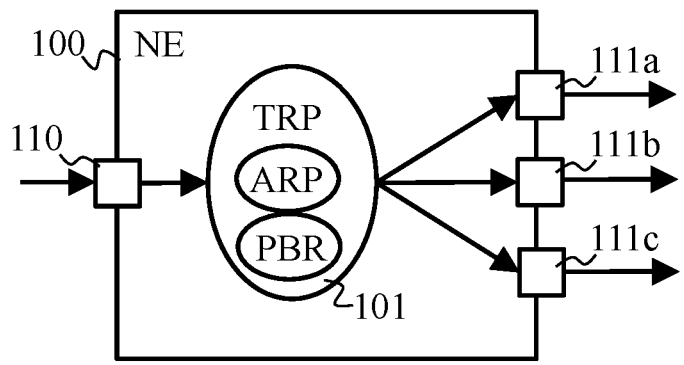
FIG. 1A schematically illustrates an arrangement of a network element according to the prior art.
Figure 1B:
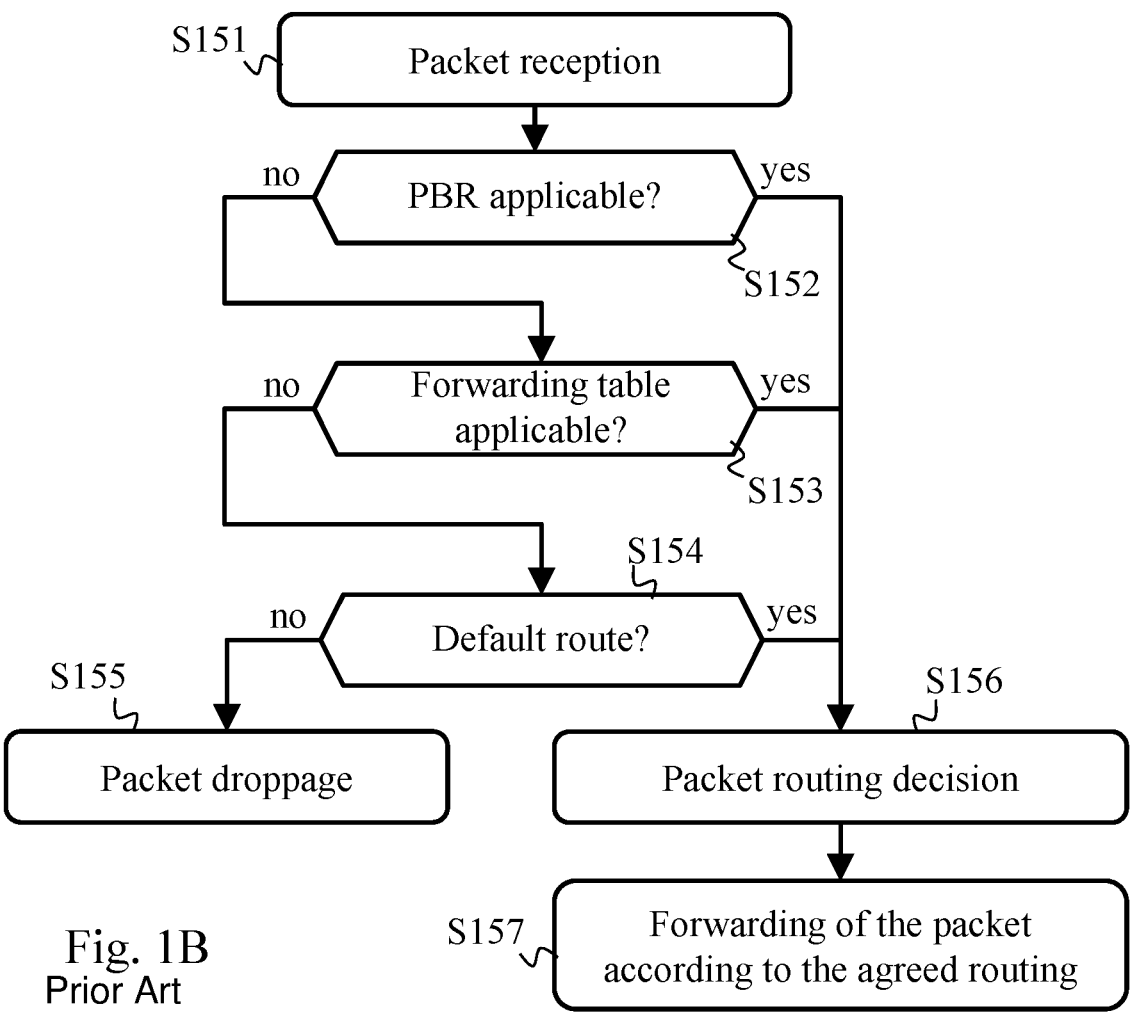
FIG. 1B schematically illustrates a routing decision algorithm implemented by the network element according to the prior art.

The network element NE 200 comprises all the interfaces 110, 111a, 111b, 111c already mentioned with respect to FIG. 1A.

When a data packet is received via the interface 110, the network element NE 200 must decide toward which other interface 111a, 111b, 111c the received data packet is to be routed. The network element NE 200 implements the traditional routing process TRP 101 already mentioned with respect to FIG. 1A. This traditional routing process TRP 101 decides, more specifically as a function of the address of the recipient of the received data packet, toward which interface 111a, 111b, 111c the data packet is to be routed so that the data packet can reach the intended recipient. Preferably, the traditional routing process TRP 101 only includes the automatic routing process ARP, but can also include policy-based routing PBR. The automatic routing process ARP implements, for example, the RIP (Routing Information Protocol) distance vector protocol, as defined in normative document RFC 2453, or the OSPF (Open Shortest Path First) link-state protocol, as defined in normative document RFC 5340, or the IS-IS (Intermediate System to Intermediate System) link-state protocol, as defined in normative document RFC 1142, or the IGRP (Interior Gateway Routing Protocol) distance vector protocol, as developed by Cisco, or the BGP (Border Gateway Protocol) route exchange protocol, as defined in normative document RFC 4271.

This traditional routing process TRP 101 thus selects, as a function of the routing decision that is taken, toward which interface 111a, 111b, 111c the data packet is to be routed, and therefore selects the corresponding internetwork communication link 210 (which defines the next network element NE 200 en route to reach the intended recipient).

The network element NE 200 further comprises as many internetwork policy-based routing functions InPBR as there are candidate egress interfaces 111a, 111b, 111c. Each internetwork policy-based routing function InPBR is assigned to one candidate egress interface 111a, 111b, 111c in particular, and vice versa. This allows dynamic behavior to be adopted for transferring data packets via the network element NE 200 for each of the internetwork communication links 210 that are connected thereto. In FIG. 3A, a first internetwork policy-based routing function InPBR 310a is thus assigned to the candidate egress interface 111a, a second internetwork policy-based routing function InPBR 310b is thus assigned to the candidate egress interface 111b, and a third internetwork policy-based routing function InPBR 310c is thus assigned to the candidate egress interface 111c. Furthermore, each internetwork policy-based routing function InPBR 310a, 310b, 310c is connected to each candidate egress interface 111a, 111b, 111c, so as to optionally be able to question the routing decision taken by the traditional routing process TRP 101.

By selecting the internetwork communication link 210 corresponding to its routing decision, the traditional routing process TRP 101 selects the corresponding internetwork policy-based routing function InPBR 310a, 310b, 310c and forwards the received data packet thereto. Thus, implicitly, the stage of internetwork policy-based routing functions InPBR is notified of the routing decision taken by the traditional routing process TRP 101. This avoids the need to duplicate, within the internetwork policy-based routing functions InPBR 310a, 310b, 310c, the routing decision criteria that are defined within the traditional routing process TRP 101, and this prevents the internetwork policy-based routing functions InPBR 310a, 310b, 310c from having to learn the possible routes in the communication network.

The internetwork policy-based routing functions InPBR 310a, 310b, 310c are configured to review the routing decision taken by the traditional routing process TRP 101.

Therefore, the relevant internetwork policy-based routing function InPBR 310a, 310b, 310c is able to either confirm the routing decision taken by the traditional routing process TRP 101 or deny this decision and route the received data packet toward another egress interface and therefore another internetwork communication link 210.

Figure 3B:
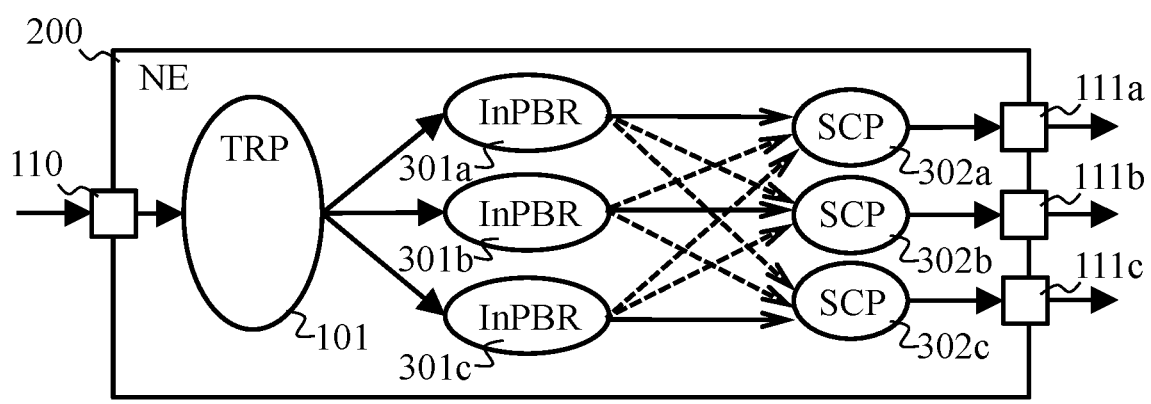
FIG. 3B schematically illustrates an arrangement of a network element according to another embodiment of the present invention.

FIG. 3B schematically illustrates an arrangement of the network elements NE 200, according to a second embodiment of the present invention. Compared to the arrangement of FIG. 3A, the arrangement of FIG. 3B introduces Service Control Points SCPs. Each service control point SCP is assigned to one candidate egress interface 111a, 111b, 111c in particular, and vice versa. A first service control point SCP 302a is thus assigned to the candidate egress interface 111a, a second service control point SCP 302b is thus assigned to the candidate egress interface 111b, and a third service control point SCP 302c is thus assigned to the candidate egress interface 111c.

The service control points SCP 302a, 302b, 302c include Quality of Service QoS management mechanisms, and, more specifically, an admission enforcement mechanism and a Policy Enforcement Point PEP, such as a Weighted Fair Queuing WFQ mechanism, that allows priority scheduling of Differentiated Services Code Point DSCP field values of IP packets. The admission enforcement mechanism is an admission mechanism for services used to limit the level of traffic congestion on an internetwork communication link 210, and that more specifically aims to anticipate congestion events, by limiting the flow or by suspending some streams of data packets on the internetwork communication link 210. For example, these quality of service QoS management mechanisms aim to align the admission of services with the actual transmission capabilities on the relevant internetwork communication links 210, which is more specifically advantageous when the relevant internetwork communication links 210 are radio links, for which the effective bandwidth is likely to vary significantly over time.

The internetwork policy-based routing functions InPBR 310a, 310b, 310c and the service control points SCP 302a, 302b, 302c thus can be used in combination to reach the same congestion management objective, for example, congestion avoidance, response to threats, quality of experience QoE management, route cost optimization, and energy optimization.

When an internetwork policy-based routing function InPBR 310a, 310b, 310c selects a candidate egress interface 111a, 111b, 111c for routing the received data packet, the internetwork policy-based routing function InPBR 310a, 310b, 310c forwards the data packet to the service control point SCP assigned to the selected candidate egress interface 111a, 111b, 111c. The relevant service control point SCP processes the data packet and subsequently forwards it to the egress interface 111a, 111b, 111c to which the service control point SCP is assigned.

Figure 3C:
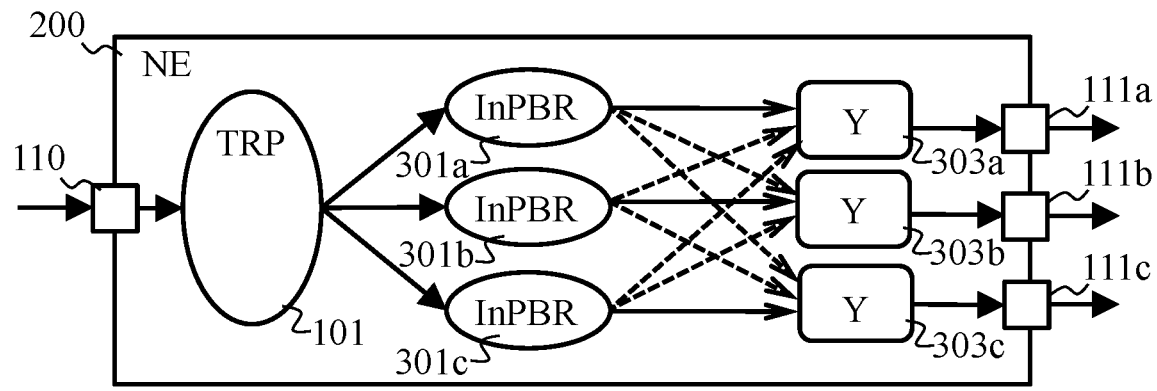
FIG. 3C schematically illustrates an arrangement of a network element according to yet another embodiment of the present invention.

FIG. 3C schematically illustrates an arrangement of the network elements NE 200, according to a third embodiment of the present invention. Compared to the arrangement of FIG. 3A, the arrangement of FIG. 3C introduces processing functions Y at the output of the network element NE 200, or more specifically after the stage of internetwork policy-based routing functions InPBR 310a, 310b, 310c has taken its routing decision. Each Y function is assigned to one candidate egress interface 111a, 111b, 111c in particular, and vice versa. A first Y function 303a is thus assigned to the candidate egress interface 111a, a second Y function 303b is thus assigned to the candidate egress interface 111b, and a third Y function 303c is thus assigned to the candidate egress interface 111c.

The Y functions can be of different types, such as, for example, customer functions, business functions, security functions, or network functions. The Y functions can be traffic analysis network functions, for example, Deep Packet Inspection DPI or data stream metrology, policy functions, location functions, or a combination of these network functions. For example, the Y functions can integrate accessibility verification functions, via the egress interfaces 111a, 111b, 111c respectively assigned to the Y functions, of the intended recipient of the received data packet.

When an internetwork policy-based routing function InPBR 310a, 310b, 310c selects a candidate egress interface 111a, 111b, 111c for routing the received data packet, the internetwork policy-based routing function InPBR 310a, 310b, 310c forwards the data packet to the Y function assigned to the selected candidate egress interface 111a, 111b, 111c. The relevant Y function processes the data packet and subsequently forwards it to the egress interface 111a, 111b, 111c to which the Y function is assigned.

Figure 3D:
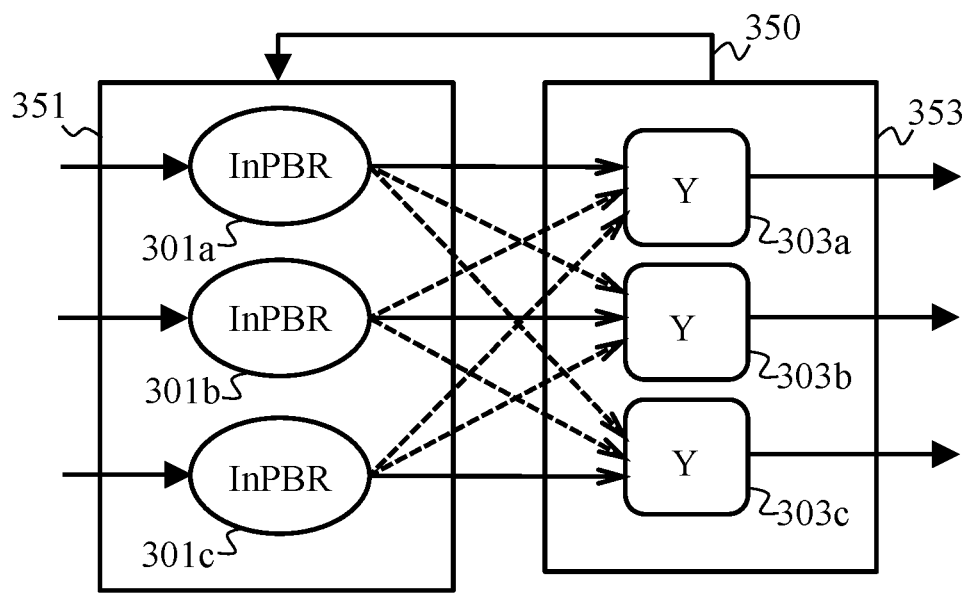
FIG. 3D schematically illustrates an arrangement of a network element according to yet another embodiment of the present invention.

FIG. 3D schematically illustrates an arrangement of the network elements NE 200, according to a fourth embodiment of the present invention. The arrangement of FIG. 3D is based on that of FIG. 3C. A feedback loop 350 connects the stage 353 of Y functions to the stage 351 of internetwork policy-based routing functions InPBR.

By virtue of the feedback loop 350, the stage 353 of Y functions provides the stage 351 of internetwork policy-based routing functions InPBR with information relating to the processing applied by the relevant Y function 303a, 303b, 303c to the data packet to be routed. This allows the internetwork policy-based routing functions InPBR 301a, 301b, 301c to adapt their routing decisions as a function of feedback provided by the Y functions 303a, 303b, 303c. The feedback loop 350 particularly can be used to request that the stage 351 of internetwork policy-based routing functions InPBR reviews its routing decision as a function of new information simultaneously provided by the stage 353 of Y functions via the feedback loop 350.

Figure 3E:
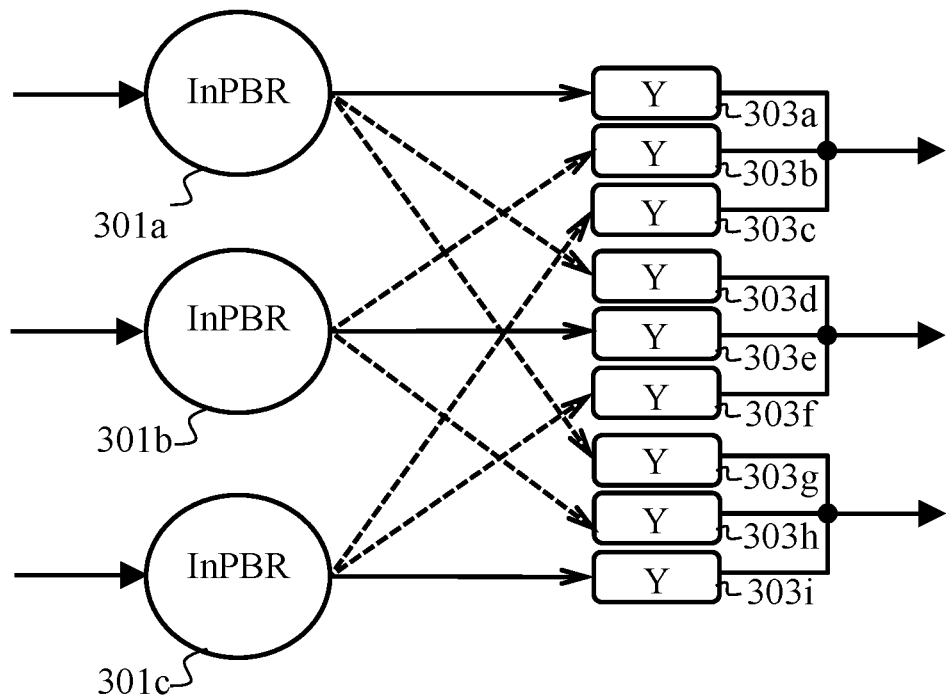
FIG. 3E schematically illustrates an arrangement of a network element according to yet another embodiment of the present invention.

FIG. 3E schematically illustrates an arrangement of the network elements NE 200, according to a fifth embodiment of the present invention. Compared to the arrangement of FIG. 3C, the arrangement of FIG. 3E introduces, for each candidate egress interface 111a, 111b, 111c, as many Y functions as there are internetwork policy-based routing functions InPBR in the network element NE 200. A first Y function 303a is thus assigned to the candidate egress interface 111a originating from the internetwork policy-based routing function InPBR 301a; a second Y function 303b is thus assigned to the candidate egress interface 111a originating from the internetwork policy-based routing function InPBR 301b; a third Y function 303c is thus assigned to the candidate egress interface 111a originating from the internetwork policy-based routing function InPBR 301c; a fourth Y function 303d is thus assigned to the candidate egress interface 111b originating from the internetwork policy-based routing function InPBR 301a; a fifth Y function 303e is thus assigned to the candidate egress interface 111b originating from the internetwork policy-based routing function InPBR 301b; a sixth Y function 303f is thus assigned to the candidate egress interface 111b originating from the internetwork policy-based routing function InPBR 301c; a seventh Y function 303g is thus assigned to the candidate egress interface 111c originating from the internetwork policy-based routing function InPBR 301a; an eighth Y function 303h is thus assigned to the candidate egress interface 111c originating from the internetwork policy-based routing function InPBR 301b; and a ninth Y function 303i is thus assigned to the candidate egress interface 111c originating from the internetwork policy-based routing function InPBR 301c.

When an internetwork policy-based routing function InPBR 310a, 310b, 310c selects a candidate egress interface 111a, 111b, 111c for routing the received data packets, the internetwork policy-based routing function InPBR 310a, 310b, 310c forwards the data packet to the Y function placed between the internetwork policy-based routing function InPBR 310a, 310b, 310c and the selected candidate egress interface 111a, 111b, 111c. The relevant Y function processes the data packet and subsequently forwards it to the egress interface 111a, 111b, 111c to which the Y function is assigned.

It should be noted that the arrangement of FIG. 3E can include the feedback loop 350 of FIG. 3D.

Figure 3F:
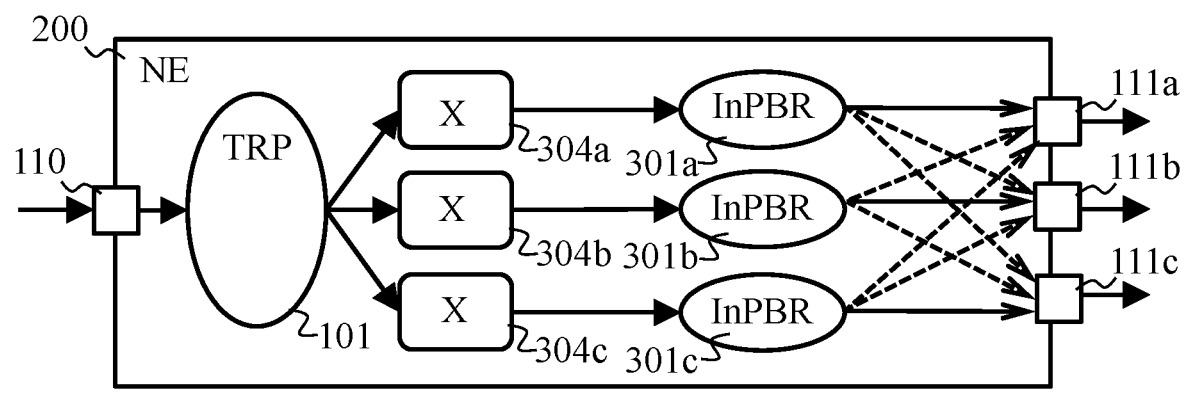
FIG. 3F schematically illustrates an arrangement of a network element according to yet another embodiment of the present invention.

FIG. 3F schematically illustrates an arrangement of the network elements NE 200, according to a sixth embodiment of the present invention. Compared to the arrangement of FIG. 3A, the arrangement of FIG. 3F introduces processing functions X at the output of the traditional routing process TRP 101, or more specifically before the stage of internetwork policy-based routing functions InPBR 310a, 310b, 310c takes its routing decision. In view of the traditional routing process TRP 101, each X function is assigned to one candidate egress interface 111a, 111b, 111c in particular, and vice versa. A first X function 304a is thus assigned to the candidate egress interface 111a (i.e., to the internetwork policy-based routing functions InPBR 310a), a second X function 304b is thus assigned to the candidate egress interface 111b (i.e., to the internetwork policy-based routing functions InPBR 310b), a third X function 304c is thus assigned to the candidate egress interface 111c (i.e., to the internetwork policy-based routing functions InPBR 310c).

The X functions can be of different types, such as, for example, customer functions, business functions, security functions, or network functions. The X functions can be traffic analysis network functions, for example, Deep Packet Inspection DPI or data stream metrology, policy functions, location functions, or a combination of these network functions.

When the traditional routing process TRP 101 selects a candidate egress interface 111a, 111b, 111c for routing the received data packet, the traditional routing process TRP 101 forwards the data packet to the X function assigned to the selected candidate egress interface 111a, 111b, 111c. The relevant X function processes the data packet and subsequently forwards it to the internetwork policy-based routing functions InPBR 310a, 310b, 310c assigned to the egress interface 111a, 111b, 111c to which the X function is also assigned.

In a particular embodiment, a control loop connects the stage of X functions to the stage 351 of internetwork policy-based routing functions InPBR (like the feedback loop 350). This allows the stage of X functions to provide information relating to the processing applied by the relevant X function 304a, 304b, 304c to the data packet to be routed, for example, following a deep packet inspection DPI, to the internetwork policy-based routing function InPBR 351. This allows, for example, the stage of X functions to force the decision of the stage 351 of internetwork policy-based routing functions InPBR.

Figure 3G:
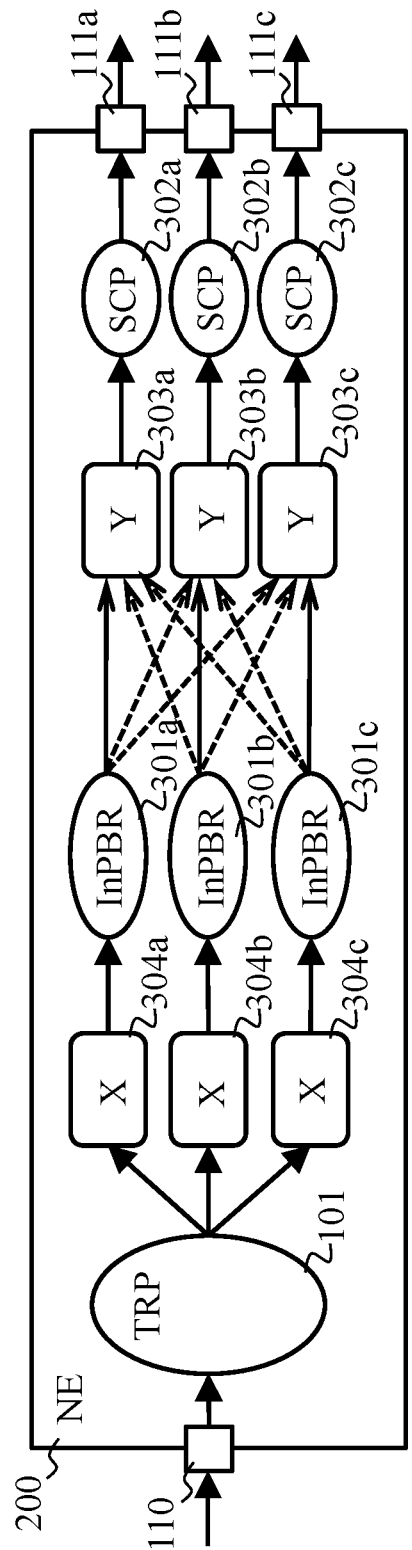
FIG. 3G schematically illustrates an arrangement of a network element according to yet another embodiment of the present invention.

FIG. 3G schematically illustrates an arrangement of the network elements NE 200, according to a seventh embodiment of the present invention. In the arrangement of FIG. 3G, the network elements NE 200 integrate the X functions, the Y functions, the service control points SCP mentioned above. The Y functions can be arranged as illustrated in FIG. 3E. The feedback loop 350 of FIG. 3D can be added, as well as the aforementioned loop control, between the stage of X functions and the stage 351 of internetwork policy-based routing functions InPBR. This provides significant flexibility for the configuration of the routing rules and the processing to be carried out on the data packets in transit.

Figure 4:
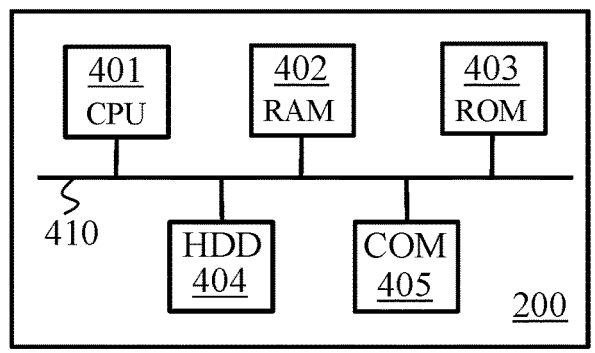
FIG. 4 schematically illustrates a hardware arrangement of the network element, according to a particular embodiment of the present invention.

FIG. 4 schematically illustrates a hardware arrangement of the network element NE 200, according to a particular embodiment of the present invention.

The network element NE 200 then includes, connected by a communication bus 410: a processor or Central Processing Unit CPU 401; a Random Access Memory RAM 402; a Read Only Memory ROM 403, a storage unit 404, such as a Hard Disk Drive HDD, or a storage medium reader, such as a Secure Digital SD card reader; and a set of at least three communication interfaces COM 405 configured to allow the network element NE 200 to communicate with other network elements NE 200 in the communication network via the internetwork communication links 210.

The processor 401 is capable of executing instructions loaded in the random access memory RAM 402 from the read only memory ROM 403, or from an external memory, or a storage medium, or a communication network. When the network element NE 200 is turned on, the processor 401 is able to read instructions from the random access memory RAM 402 and to execute them. These instructions form a computer program causing the implementation, by the processor 401, of all or some of the algorithms and steps described hereafter.

All or some of the algorithms and steps described hereafter, as well as the architectures presented above with respect to FIG. 3A to 3G, thus can be implemented in software form by executing a set of instructions via a programmable machine, for example, a Digital Signal Processor DSP or a microprocessor, or can be implemented in hardware form by a dedicated machine or component (chip) or a set of dedicated components (chipset), such as, for example, a Field-Programmable Gate Array FPGA component or an Application-Specific Integrated Circuit ASIC component. In general, the network element NE 200 comprises electronic circuitry configured to implement the architectures described above with reference to FIG. 3A to 3G, and the algorithms and steps described hereafter.

Figure 5:
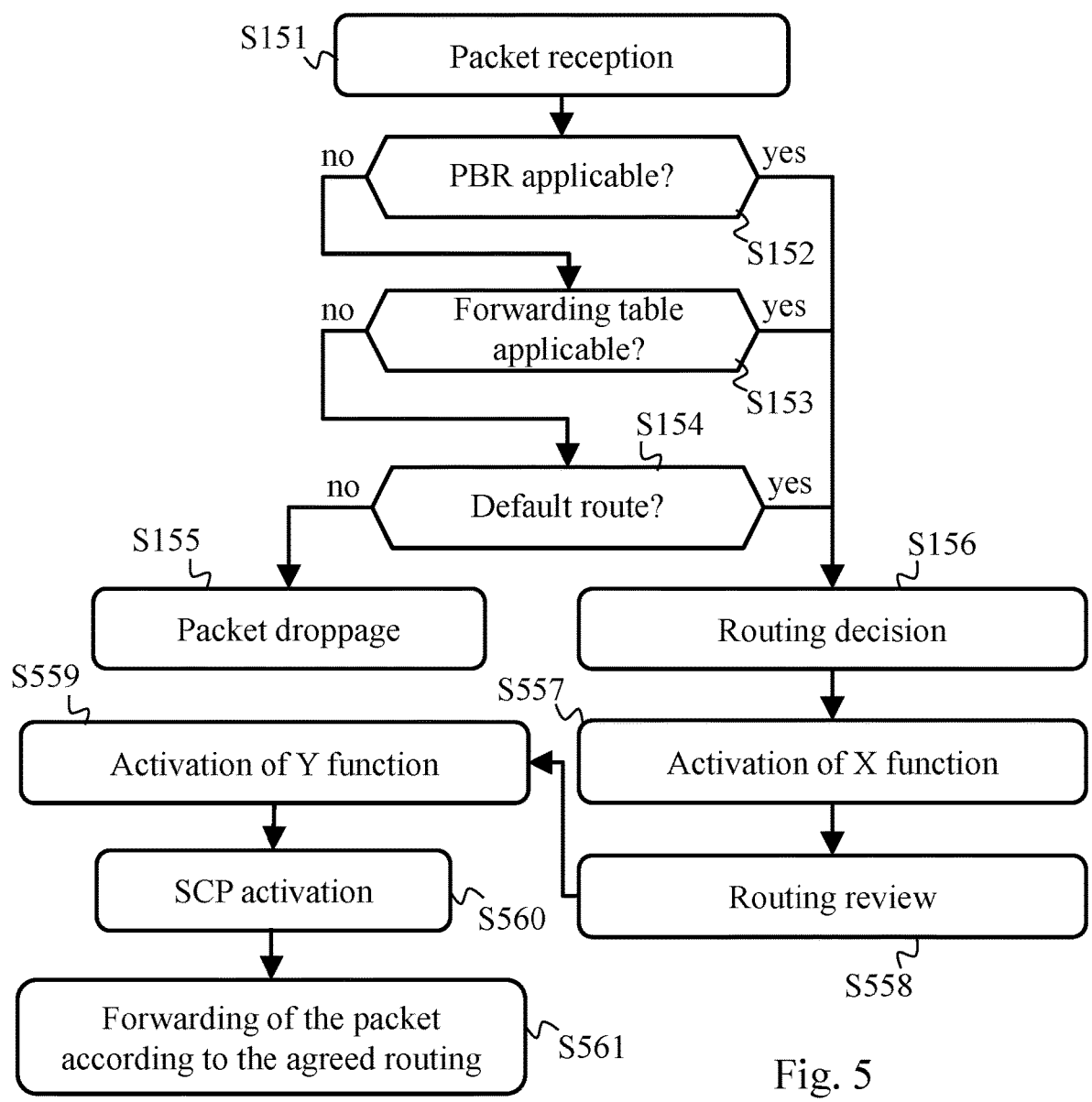
FIG. 5 schematically illustrates a routing decision algorithm implemented by the network element, according to a particular embodiment of the present invention.

FIG. 5 schematically illustrates a routing decision algorithm implemented by the network element NE 200, according to a particular embodiment of the present invention. The algorithm of FIG. 5 is based on the steps of the algorithm of FIG. 1A, except that these steps are executed by the network element NE 200 instead of the network element NE 100.

In step S151, the network element NE 200 receives a data packet via an ingress interface of the network element NE 200.

In step S152, the network element NE 100 verifies whether the received packet corresponds to a PBR routing rule. If so, step S156 is carried out, in which the network element NE 100 takes a routing decision in accordance with the PBR routing rule to which the received data packet corresponds, and a step S557 is subsequently carried out; otherwise, step S153 is carried out.

In step S153, the network element NE 200 turns to the automatic routing process ARP and verifies whether the received packet corresponds to a routing rule in the forwarding table. If so, step S156 is carried out, in which the network element NE 200 takes a routing decision in accordance with the routing rule found in the forwarding table and to which the received data packet corresponds, and step S557 is subsequently carried out; otherwise, step S154 is carried out.

It should be noted that the network element NE 200 cannot implement PBR routing rules within the traditional routing process TRP 101. In this case, the algorithm of FIG. 5 transitions directly from step S151 to step S153.

In step S154, the network element NE 200 verifies whether the received packet corresponds to a default route. If so, step S156 is carried out, in which the network element NE 200 takes a routing decision in accordance with the default route, and step S557 is subsequently carried out; otherwise, step S155 is carried out.

In step S155, the network element NE 200 is considered to be unable to take a routing decision relating to the received data packet and then drops the data packet; by contrast, in step S557, the traditional routing process TRP 101 of the network element NE 200 was able to take a routing decision relating to the received data packet. The decision taken by the traditional routing process TRP 101 in step S156 nevertheless can be questioned by the stage 351 of internetwork policy-based routing functions InPBR.

Thus, in step S557, the network element NE 200 optionally applies the X function assigned to the candidate egress interface 111a, 111b, 111c selected by the traditional routing process TRP 101 on completion of step S156.

In a step S558, the network element NE 200 turns to the internetwork policy-based routing function InPBR assigned to the candidate egress interface 111a, 111b, 111c selected by the traditional routing process TRP 101 on completion of step S156. The routing decision taken by the traditional routing process TRP 101 on completion of step S156 is thus confirmed or denied. An embodiment is described hereafter with reference to FIG. 6.

In a step S559, the network element NE 200 optionally applies the Y function assigned to the candidate egress interface 111a, 111b, 111c selected by the relevant internetwork policy-based routing function InPBR in step S558.

In a step S560, the network element NE 200 optionally carries out processing via the service control point SCP assigned to the candidate egress interface 111a, 111b, 111c selected by the relevant internetwork policy-based routing function InPBR in step S558 and optionally also assigned to the relevant internetwork policy-based routing function InPBR in step S558 (see FIG. 3E). An embodiment is described hereafter with reference to FIG. 7.

In a step S561, the network element NE 200 applies the routing decision taken in step S156 and optionally reviewed in step S558, and consequently transmits the data packet via its corresponding egress interface.

Figure 6:
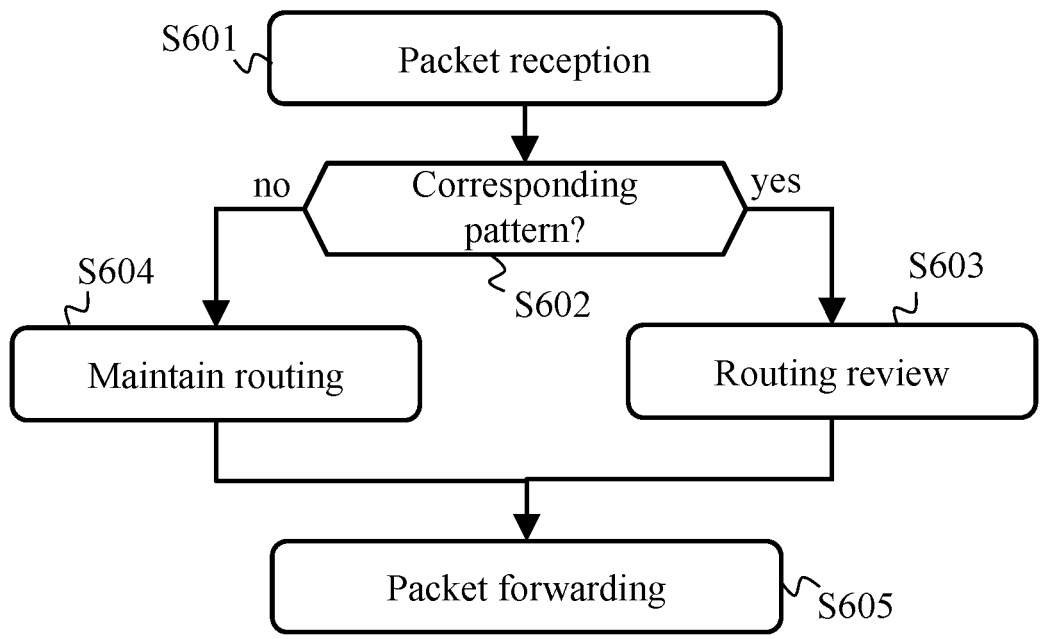
FIG. 6 schematically illustrates an algorithm for reviewing a routing decision implemented by the network element, according to a particular embodiment of the present invention.

FIG. 6 schematically illustrates an algorithm for reviewing a routing decision implemented by the network element NE 200, according to a particular embodiment of the present invention. The algorithm of FIG. 6 is more specifically implemented by each internetwork policy-based routing function InPBR.

In a step S601, the relevant internetwork policy-based routing function InPBR receives a data packet, the routing decision of which must be confirmed or denied. The relevant internetwork policy-based routing function InPBR is assigned to the candidate egress interface 111a, 111b, 111c selected by the traditional routing process TRP 101. The routing decision relating to the data packet that was taken by the traditional routing process TRP 101 therefore is implicitly known by the internetwork policy-based routing function InPBR 351.

In a step S602, the internetwork policy-based routing function InPBR verifies whether the received data packet corresponds to a predefined routing rule within the internetwork policy-based routing function InPBR.

The routing rules are preferably expressed in the form of regular expressions, called "RegEx". The regular expressions contain a "condition" portion and an "action" portion, with the "condition" portion defining one or more conditions to be met by the data packet so that one or more actions, such as those defined in the "action" portion, are applied to the data packet.

For example, a regular expression can state that all the packets of a particular enforcement instance, therefore of level L-7 in the Open Systems Interconnection OSI model, follow a predefined route in the communication network. According to another example, a regular expression can state that all the data packets containing a Type of Service TOS field with a hexadecimal value "0xEF" are routed toward the egress interface 111a, and that the routing of the other data packets is carried out as decided by the traditional routing process TRP 101. Thus, it is easy to program a selective interruption, for example, by an enforcement instance generating the data packet or by the type of enforcement generator of the data packet, of some internetwork communication links 210, whereas the automatic routing process ARP would force the routing relative to the destination of the data packets. Such selective interruption can be set up for the sake of preserving bandwidth, of quality of experience QoE control, but also for security reasons, in order to ensure that certain data streams do not pass over certain internetwork communication links 210, the reliability of which would be uncertain.

The internetwork policy-based routing function InPBR therefore checks whether the received data packet corresponds to a predefined pattern of RegEx. If so, a step S603 is carried out; otherwise, a step S604 is carried out.

In step S603, the internetwork policy-based routing function InPBR reviews the decision for routing the data packet, by applying the routing rule to which the data packet corresponds. The routing decision to be applied, which ultimately can be the same as that taken by the traditional routing process TRP 101, is defined in the "action" portion of the regular expression for which the data packet meets the conditions of the "condition" portion. This means that the "action" portion of each regular expression of the routing rule at least indicates to which egress interface each data packet is to be routed that corresponds to the "condition" portion of the regular expression. Then, a step S605 is carried out.

In addition to the routing decision review, the internetwork policy-based routing function InPBR can apply processing to the data packet. Such processing is indicated in the "action" portion of the relevant regular expression. Such processing involves, for example, marking the data packet, encapsulating the data packet, even de-encapsulating the data packet.

In a particular embodiment, the internetwork policy-based routing function InPBR applies marking to the data packets for which the internetwork policy-based routing function InPBR modifies the routing decision taken by the traditional routing process TRP 101.

For example, the internetwork policy-based routing function InPBR registers, in a predefined field of the data packet, an identifier such as a ColoIDentifier CID that is uniquely assigned to the internetwork policy-based routing function InPBR in the communication network. Such marking allows the loop situations in the communication network to be managed, with the internetwork policy-based routing function InPBR thus being able to recognize the data packets for which the internetwork policy-based routing function InPBR has modified the routing decision taken by the traditional routing process TRP 101, and to apply dedicated processing thereto by means of a suitable, predefined routing rule, RegEx, and thus prevent the data packet from continuing to loop in the communication network. The Time To Live TTL field of IP data packets can be used to register the Color IDentifier CID. Indeed, by implementing a loop control on the basis of the Color IDentifiers CID in a communication network only structured by network elements according to the network element NE 200, the TTL field of the IP data packets is not strictly necessary and therefore can be used other than as recommended in the normative document RFC 791, without loss of functionality.

In step S604, the internetwork policy-based routing function InPBR confirms the routing decision taken by the traditional routing process TRP 101. Indeed, this means that the data packet does not correspond to any routing rule, and step S605 is subsequently carried out.

In step S605, the internetwork policy-based routing function InPBR forwards the data packet according to the routing decision taken by the traditional routing process TRP 101 or, if applicable, reviewed in step S603.

Figure 7:
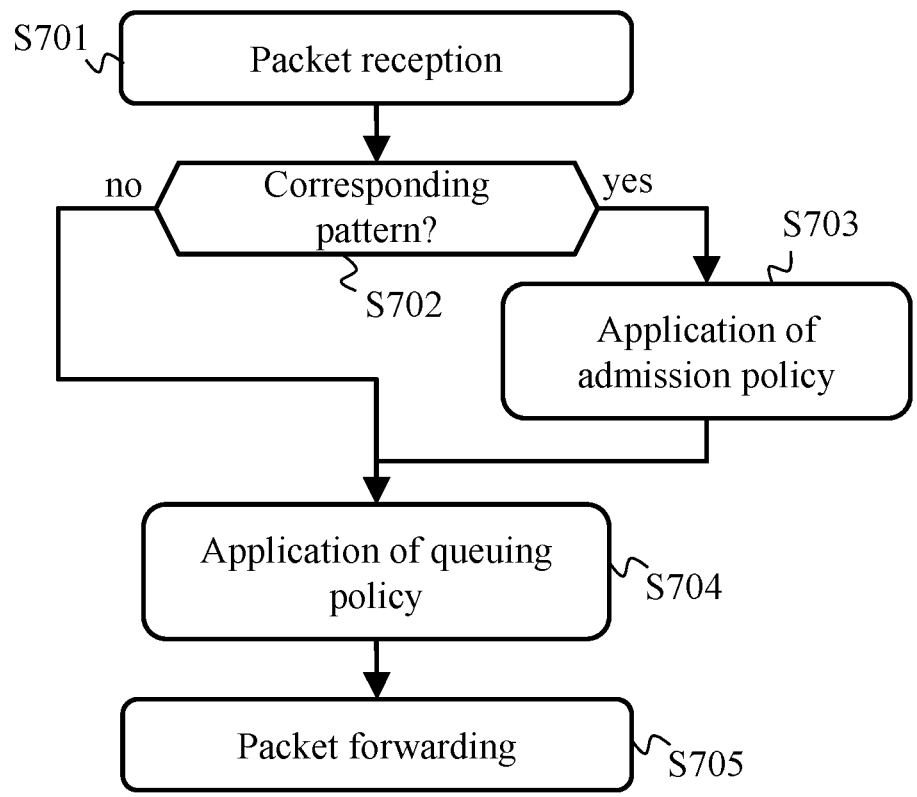
FIG. 7 schematically illustrates an admission policy management algorithm implemented by the network element, according to a particular embodiment of the present invention.

FIG. 7 schematically illustrates an admission policy management algorithm implemented by the network element NE 200, according to a particular embodiment of the present invention. The algorithm of FIG. 7 is more specifically implemented by each service control point SCP.

In a step S701, the relevant service control point SCP receives a data packet, the routing decision of which has been confirmed or denied by the internetwork policy-based routing function InPBR assigned to the egress interface 111a, 111b, 111c originally selected by the traditional routing process TRP 101. The service control point SCP is, for its part, assigned to the egress interface 111a, 111b, 111c finally retained by the internetwork policy-based routing function InPBR.

In a step S702, the service control point SCP verifies whether the received data packet corresponds to a predefined admission policy rule within the service control point SCP. Like the routing rules of the internetwork policy-based routing functions InPBR, the admission policy rules are preferably expressed in the form of regular expressions, "RegEx".

The service control point SCP therefore checks whether the received data packet corresponds to a predefined pattern of RegEx. If so, a step S703 is carried out; otherwise, a step S704 is carried out.

In step S703, the service control point SCP applies the admission policy rule to which the data packet corresponds. The admission policy is defined in the "action" portion of the regular expression for which the data packet meets the conditions of the "condition" portion. Then, step S704 is carried out.

In step S704, the service control point SCP applies a queuing policy to the data packet.

In a step S705, the service control point SCP forwards the data packet to the egress interface 111a, 111b, 111c to which the service control point SCP is assigned.

The internetwork policy-based routing functions InPBR, the service control points SCP, the X functions and the Y functions thus can be defined by distinct or identical control planes, in a centralized or distributed manner. This results in significant configuration flexibility for the network elements NE 200, which allows selective interruption of the internetwork communication links 210 to be carried out, with this being based on various criteria: service aware routing, QoS aware routing, performance aware routing, energy aware routing, etc. The configuration of the internetwork policy-based routing functions InPBR, of the service control points SCP, of the X functions and of the Y functions can be carried out manually, by an installer by virtue of a configuration interface of the relevant network element NE 200, or automatically, by virtue of a control engine, such as a network controller defined by Software Defined Network SDN software, a network orchestrator or an artificial intelligence engine.

Figure 1C:
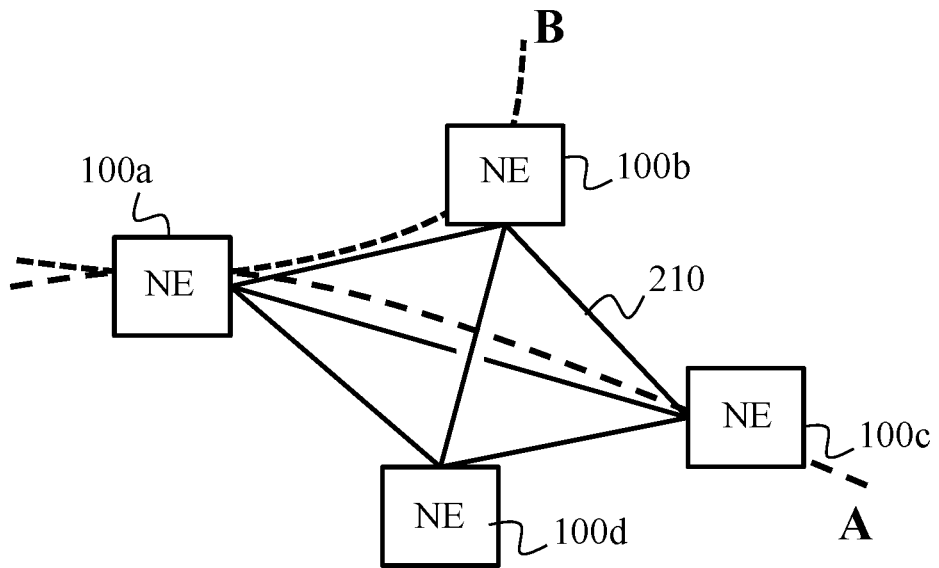
FIG. 1C schematically illustrates an example of the result of a routing decision according to the prior art.
Figure 1D:
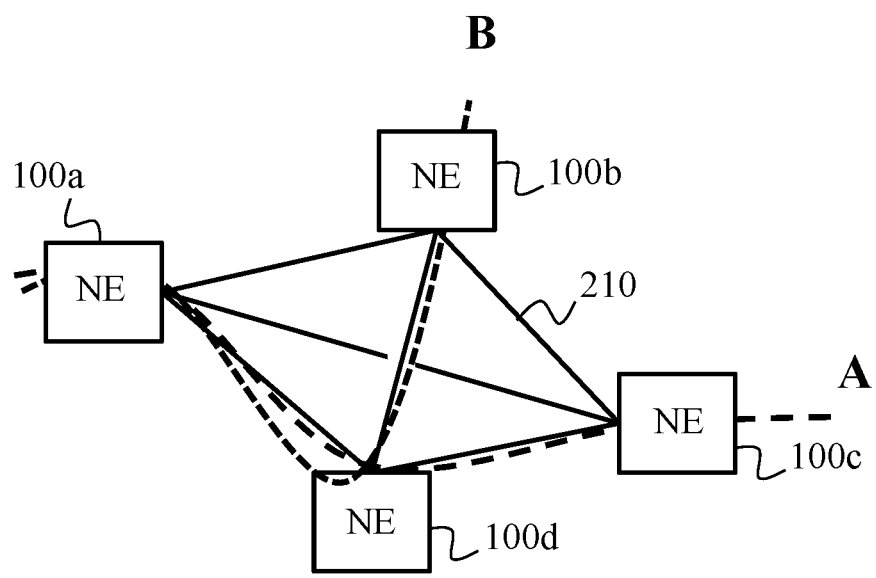
FIG. 1D schematically illustrates another example of a result of a routing decision according to the prior art.
Figure 8:
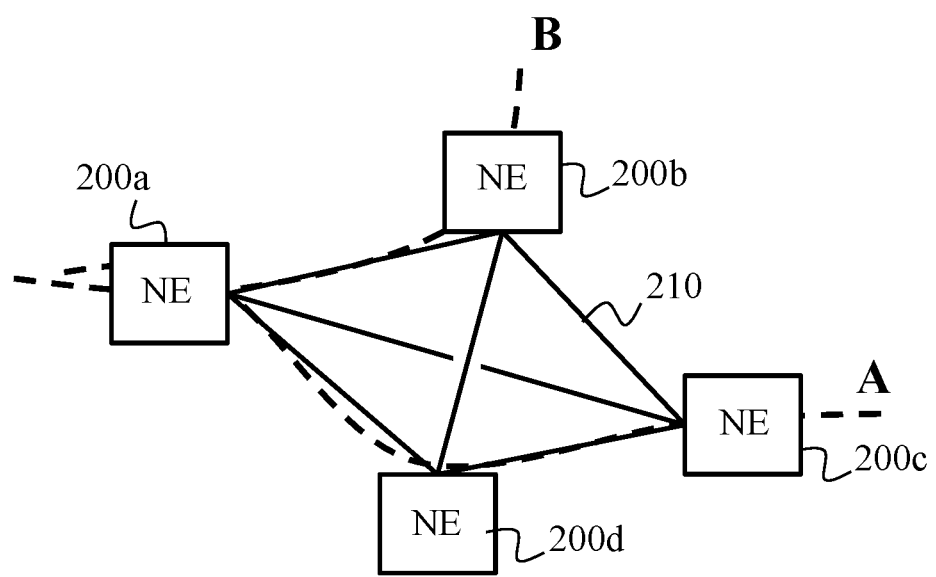
FIG. 8 schematically illustrates an example of the result of a routing decision applying the present invention.

Given that the internetwork policy-based routing functions InPBR, the service control points SCP, the X functions and the Y functions are placed downstream of the traditional routing process TRP 101, the applied actions are implicitly aware of the routes involved, which allows precise application of the interruption actions. With further reference to the example cited in the introduction, the use of internetwork policy-based routing functions InPBR allows the routing shown in FIG. 8 to be obtained instead of that shown in FIG. 1D. In FIG. 8, the stream of data packets A is routed between the network element NE 200a and the network element NE 200c via the network element NE 200d, whereas the stream of data packets B is directly routed between the network element NE 100a and the network element NE 200b. By way of a reminder, the automatic routing process ARP based on a routing protocol seeking the shortest path would have routed the stream of data packets A directly between the network element NE 200a and the network element NE 200c (see FIG. 1C). By way of a reminder, the PRB routing rules of the traditional routing process TRP 101 would have diverted both the stream of data packets A and the stream of data packets B (see FIG. 1D), unless the learning of routes had been duplicated in the PRB routing rules of the traditional routing process TRP 101. By configuring the internetwork policy-based routing function InPBR assigned to the egress interface of the network element NE 200a that directly interconnects the link to be interrupted, this avoids the unwanted interruption of other internetwork communication links 210.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for routing a data packet through a first network element of a communication network, further comprising a plurality of second network elements, the first and second network elements being interconnected by internetwork communication links, the routing method comprising:

a traditional routing process including taking a routing decision as a function of a destination of the data packet according to route learning in the communication network; and, reviewing the routing decision via an internetwork policy-based routing function selected from among a plurality of candidate internetwork policy-based routing functions of said first network element, each candidate internetwork policy-based routing function being assigned to an egress interface of said first network element and each egress interface of said first network element being assigned to one said candidate internetwork policy-based routing function, the selected internetwork policy-based routing function being the candidate internetwork policy-based routing function assigned to the egress interface selected by the traditional routing process for routing said data packet in the communication network, wherein, with said first network element comprising an egress processing function assigned to each egress interface of said first network element, the data packet is processed by the egress processing function assigned to the egress interface selected by the selected internetwork policy-based routing function, and, wherein, with said first network element comprising a feedback loop from the egress processing functions to the internetwork policy-based routing functions, the egress processing functions supply the internetwork policy-based routing functions with information relating to the processing applied by the egress processing functions to said data packet.

2. The method as claimed in claim 1, wherein, with said first network element comprising a service control point assigned to each egress interface of said first network element and each egress interface of said first network element being assigned to one said candidate internetwork policy-based routing function, the method further comprising processing the data packet by the service control point assigned to the egress interface selected by the selected internetwork policy-based routing function, and wherein each service control point includes an admission enforcement mechanism and a policy enforcement point.

3. The method as claimed in claim 1, wherein, with said first network element comprising, for each egress interface, as many egress processing functions as there are internetwork policy-based routing functions, the data packet is processed by an egress processing function selected from among the egress processing functions assigned to the egress interface selected by the selected internetwork policy-based routing function, with the selected egress processing function being the egress processing function associated with the selected internetwork policy-based routing function.

4. The method as claimed in claim 1, wherein the egress processing function assigned to the egress interface selected by the selected internetwork policy-based routing function requests that said selected internetwork policy-based routing function reviews the decision for routing the data packet on the basis of information simultaneously supplied by said egress processing function via the feedback loop.

5. The method as claimed in claim 4, wherein, with said first network element comprising an egress processing function of the traditional routing process assigned to each egress interface of said first network element and each egress interface of said first network element being assigned to one said candidate internetwork policy-based routing function, the data packet is processed by the egress processing function of the traditional routing process assigned to the egress interface selected by the traditional routing process before the review of the routing decision by the selected internetwork policy-based routing function.

6. The method as claimed in claim 5, wherein, with said first network element comprising a control loop from the egress processing functions of the traditional routing process to the internetwork policy-based routing functions, the egress processing functions of the traditional routing process supply the internetwork policy-based routing functions with information relating to the processing applied by the egress processing functions of the traditional routing process.

7. The method as claimed in claim 1, wherein the traditional routing process implements an OSPF link-state protocol.

8. The method as claimed in claim 1, wherein the internetwork policy-based routing functions apply routing rules expressed as regular expressions.

9. A non-transitory information storage medium, which stores a computer program product comprising instructions causing the implementation, by a network element, when the instructions are read and executed by a processor of the network element of a method for routing a data packet through a first network element of a communication network, further comprising a plurality of second network elements, the first and second network elements being interconnected by internetwork communication links, the routing method comprising:

a traditional routing process including taking a routing decision as a function of a destination of the data packet according to route learning in the communication network; and, reviewing the routing decision via an internetwork policy-based routing function selected from among a plurality of candidate internetwork policy-based routing functions of said first network element, each candidate internetwork policy-based routing function being assigned to an egress interface of said first network element and each egress interface of said first network element being assigned to one said candidate internetwork policy-based routing function, the selected internetwork policy-based routing function being the candidate internetwork policy-based routing function assigned to the egress interface selected by the traditional routing process for routing said data packet in the communication network, wherein, with said first network element comprising an egress processing function assigned to each egress interface of said first network element, the data packet is processed by the egress processing function assigned to the egress interface selected by the selected internetwork policy-based routing function, and, wherein, with said first network element comprising a feedback loop from the egress processing functions to the internetwork policy-based routing functions, the egress processing functions supply the internetwork policy-based routing functions with information relating to the processing applied by the egress processing functions to said data packet.

10. A network element, called the first network element, of a communication network, further comprising a plurality of second network elements, the first and second network elements being configured to be interconnected by internetwork communication links, the first network element implementing a traditional routing process including taking a routing decision as a function of a destination of a data packet according to route learning in the communication network, wherein the first network element comprises:

electronic circuitry configured to review the routing decision taken by the traditional routing process by means of an internetwork policy-based routing function selected from among a plurality of candidate internetwork policy-based routing functions of said first network element, each candidate internetwork policy-based routing function being assigned to an egress interface of said first network element and each egress interface of said first network element being assigned to one said candidate internetwork policy-based routing function, the selected internetwork policy-based routing function being the candidate internetwork policy-based routing function assigned to the egress interface selected by the traditional routing process for routing said data packet in the communication network, wherein, with said first network element comprising an egress processing function assigned to each egress interface of said first network element, the data packet is processed by the egress processing function assigned to the egress interface selected by the selected internetwork policy-based routing function, and, wherein, with said first network element comprising a feedback loop from the egress processing functions to the internetwork policy-based routing functions, the egress processing functions supply the internetwork policy-based routing functions with information relating to the processing applied by the egress processing functions to said data packet.

11. A communication network comprising network elements interconnected by internetwork communication links, each network element being a network element, called a first network element, of the communication network, further comprising a plurality of second network elements, the first and second network elements being configured to be interconnected by the internetwork communication links, the first network element implementing a traditional routing process including taking a routing decision as a function of a destination of a data packet according to route learning in the communication network, wherein the first network element comprises:

electronic circuitry configured to review the routing decision taken by the traditional routing process by means of an internetwork policy-based routing function selected from among a plurality of candidate internetwork policy-based routing functions of said first network element, each candidate internetwork policy-based routing function being assigned to an egress interface of said first network element and each egress interface of said first network element being assigned to one said candidate internetwork policy-based routing function, the selected internetwork policy-based routing function being the candidate internetwork policy-based routing function assigned to the egress interface selected by the traditional routing process for routing said data packet in the communication network, wherein, with said first network element comprising an egress processing function assigned to each egress interface of said first network element, the data packet is processed by the egress processing function assigned to the egress interface selected by the selected internetwork policy-based routing function, and, wherein, with said first network element comprising a feedback loop from the egress processing functions to the internetwork policy-based routing functions, the egress processing functions supply the internetwork policy-based routing functions with information relating to the processing applied by the egress processing functions to said data packet.

\* \* \* \* \*